United States Patent
Horiba

(10) Patent No.: US 7,388,860 B2
(45) Date of Patent: Jun. 17, 2008

(54) NETWORK COMMUNICATION APPARATUS, COMMUNICATION SYSTEM AND COMMUNICATION METHOD

(75) Inventor: Kazuhiro Horiba, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 647 days.

(21) Appl. No.: 10/937,390

(22) Filed: Sep. 10, 2004

(65) Prior Publication Data

US 2005/0058123 A1      Mar. 17, 2005

(30) Foreign Application Priority Data

Sep. 11, 2003   (JP) .............................. 2003-319265

(51) Int. Cl.
*H04L 12/66* (2006.01)
(52) U.S. Cl. .................. 370/352; 370/395.5; 709/203; 455/306
(58) Field of Classification Search .............. 370/352, 370/395.5, 401
See application file for complete search history.

(56) References Cited

U.S. PATENT DOCUMENTS 7,068,763 B2 * 6/2006 Burrell et al. ............ 379/88.13

| | | | |
|---|---|---|---|
| 2003/0164986 A1 | 9/2003 | Boire-Lavigne et al. | |
| 2003/0179763 A1 | 9/2003 | Horiba | |
| 2003/0193696 A1* | 10/2003 | Walker et al. | 358/402 |
| 2004/0097188 A1* | 5/2004 | Tanimoto | 455/3.06 |
| 2006/0095501 A1* | 5/2006 | Mochida | 709/203 |

FOREIGN PATENT DOCUMENTS

JP   2001-292267   10/2001
JP   2002-176462   6/2002

OTHER PUBLICATIONS

"Procedures for real-time Group 3 facsimile communication over IP networks", ITU-T Recommendation T.38, XP-002163782, Jun. 1998, 30 Pages.

* cited by examiner

*Primary Examiner*—Chi Pham
*Assistant Examiner*—Phuc Tran
(74) *Attorney, Agent, or Firm*—Oblon, Spivak, McClelland, Maier & Neustadt, P.C.

(57) ABSTRACT

A network terminal apparatus in a type of directly connecting to a packet communication network, with an interface for connecting to a circuit under an environment of an SIP terminal network, and a capability of carrying out facsimile transmission/reception, carries out a call control method according to SIP, transmits and receives an SDP added to a message body of an SIP, and carries out, in a same session, both a call control session transmitting and receiving an SIP message and an SDP and a T.38 session transmitting and receiving a T.38 signal.

9 Claims, 6 Drawing Sheets

```
v=0
o=fax1 2890844527 171090 IN IP4 192.168.1.100
s=Session SDP
c=IN IP4 192.168.1.100
t=0 0
m=image 49172 udptl t38
a=T38FaxVersion:0
a=T38MaxBitRate:9600
a=T38FaxRateManagement:transferredTCF
a=T38FaxMaxBuffer:72
a=T38FaxMaxDatagram:316
a=T38FaxUdpEC:t38UDPFEC
a=T38FaxUdpEC:t38UDPRedundancy
a=manufactureCode:25
```

(EXAMPLE OF SDP ADDING MANUFACTURE CODE)

NETWORK COMMUNICATION APPARATUS, COMMUNICATION SYSTEM AND COMMUNICATION METHOD

BACKGROUND OF THE INVENTION

1. The Field of the Invention

The present invention relates to a network communication apparatus, a communication system and a communication method, and, in particular, to a network communication apparatus, a communication system and a communication method in which the network communication apparatus is in a packet network direct connectable type, has an interface for connecting to a LAN circuit under network environment for SIP terminals, and has a capability to carry out facsimile transmission/reception.

2. The Description of the Related Art

In general, in a network communication apparatus in a packet network direct connectable type having an interface for connecting to a local area network under environment of a network for SIP terminals and having a capability of carrying out facsimile transmission/reception, it is necessary to establish a data channel for each of both directions for carrying out data transfer for the purpose of mutual communication between network communication apparatuses (see Japanese Laid-open Patent Application No. 2001-292267).

SUMMARY OF THE INVENTION

Further, it is necessary to carry out call connection first for the purpose of establishing a data channel, and, therefore, it is necessary to establish one call connection channel and two data channels. For the call connection channel, normally a Well-known port is allocated, while, a data channel is dynamically determined during a call connection procedure. Thereby, in a case where communication is carried out via a firewall, or in a case where a network communication apparatus carries out communication via a NAT (network address translation), a port for the thus-determined data channel may not be one with which data cannot pass through the firewall or the NAT, whereby communication may not be carried out.

An object of the present invention is to provide a network communication apparatus, a communication system and a communication method by which data transmission can be carried out with the use of a call connection channel under SIP environment.

According to the present invention, a network communication apparatus in a type of directly connectable with to a packet communication network, having an interface for connecting to a circuit under an environment of a communication network for SIP terminals, and having a capability of carrying out facsimile transmission/reception, includes: a call control part carrying out a call control process in an SIP; and an SDP control part transmitting and receiving an SDP added to a message body of the SIP, wherein: the network communication apparatus carries out, in a same session, both a call control session transmitting and receiving an SIP message and an SDP, and a T.38 session transmitting and receiving a T.38 signal.

In this configuration, since a same channel as a call connection channel once established for an SIP is also used to carry out T.38 data transfer, and thus, data can be transferred with the use of a Well-known port, it is possible to reduce a required resource such as a memory, and also, T.38 data transfer can be carried out properly even in a case where communication is carried out via a firewall, or in a case where the network communication apparatus carries out communication via a NAT.

The network communication apparatus may further include: a determining part determining whether or not the SIP session and the T.38 session can be carried out in a same session, wherein: in a case of requesting carrying out of the SIP session and the T.38 session in a same session and determining previously that data transfer can be carried out in a same session, the network communication apparatus omits transmission of a BYE message and a responding message therefor in the SIP.

In this configuration, since it can be determined whether a terminal in a counterpart has a same capability as that of an own terminal by adding terminal information to an SPD, and then, a procedure of a BYE (finish) message in the SIP and a responding message (200 OK) thereto can be omitted, it is possible to carry out finishing processing within a shorter time.

The network communication apparatus may further include: a determining part determining whether or not the SIP session and the T.38 session can be carried out in a same session, wherein: in a case of once requesting carrying out of the SIP session and the T.38 session in a same session while not being able to determine that data transfer can be carried out in a same session, the communication apparatus receives a BYE message in the SIP after completion of T.38 communication, and transmits a responding message therefor.

In this configuration, since it can be determined whether a terminal in a counterpart does not have a same capability as that of an own terminal by adding terminal information to an SPD, it is possible to determine whether or not a procedure of a BYE (finishing) message in the SIP and a responding message (200 OK) thereto is necessary, and, it is possible to also carry out communication with the use of a normal sequence when it is determined that the above-mentioned procedure is necessary.

BRIEF DESCRIPTION OF THE DRAWINGS

Other objects and further features of the present invention will become more apparent from the following detailed description when read in conjunction with the accompanying drawings.

DETAILED DESCRIPTION OF THE PREFERRED EMBODIMENT

With reference to accompanying figures, a preferred embodiment of the present invention are described next in detail.

Figure 1:
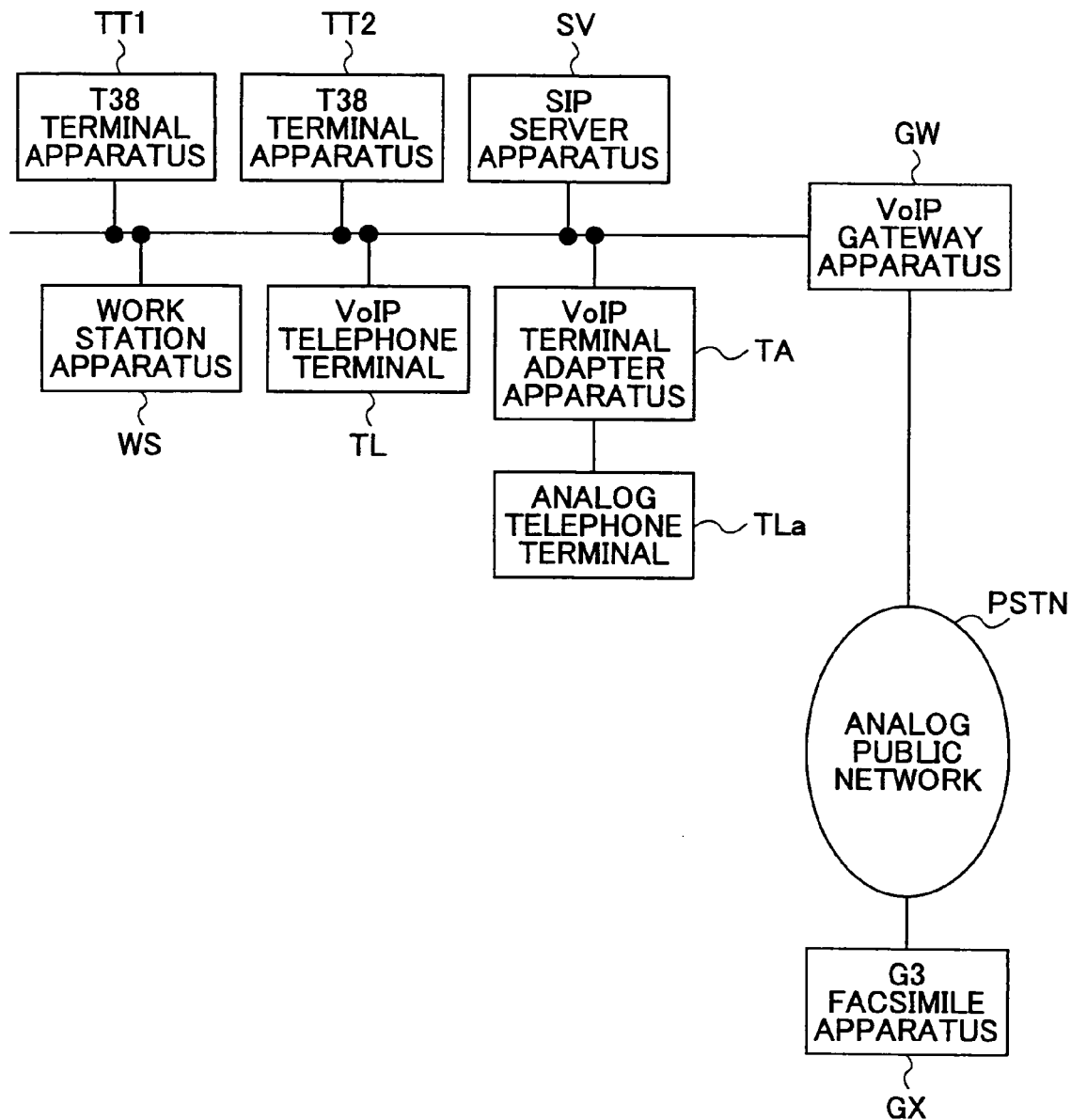
FIG. 1 is a block diagram showing a network system according to one embodiment of the present invention.

FIG. 1 shows a network system according to an embodiment of the present invention. In this network system, call control or such for network communication is carried out under an SIP (session initiation protocol: see RFC3261 for details) environment basically.

As shown in FIG. 1, to a local area network LAN, two T38 terminal apparatuses TT1 and TT2 which carry out internet facsimile communication in a real-time type in compliance with ITU-T recommendation T.38 (acting as a calling-side T38 terminal apparatus and a called-side T38 terminal apparatus), a work station WS for carrying out various sorts of data processing (including data communication under the SIP environment), a VoIP telephone terminal TL for carrying out voice communication via an IP network such as the local area network LAN and an analog telephone terminal TLa are connected. Also, to the local area network LAN, a VoIP terminal adapter TA for carrying out interface conversion for the analog telephone terminal TLa for enabling the analog terminal TLa to carry out voice communication via an IP network such as the local area network LAN, and an SIP server apparatus SV having functions of a proxy server, a redirect server and a registration server are connected. Also, a configuration is provided such that communication with a group 3 facsimile apparatus GX which is connected with an analog public network PSTN and also with the local area network LAN via a VoIP gateway GW, is made possible.

The VoIP terminal adapter TA has a call control function under the SIP environment.

Figure 2:
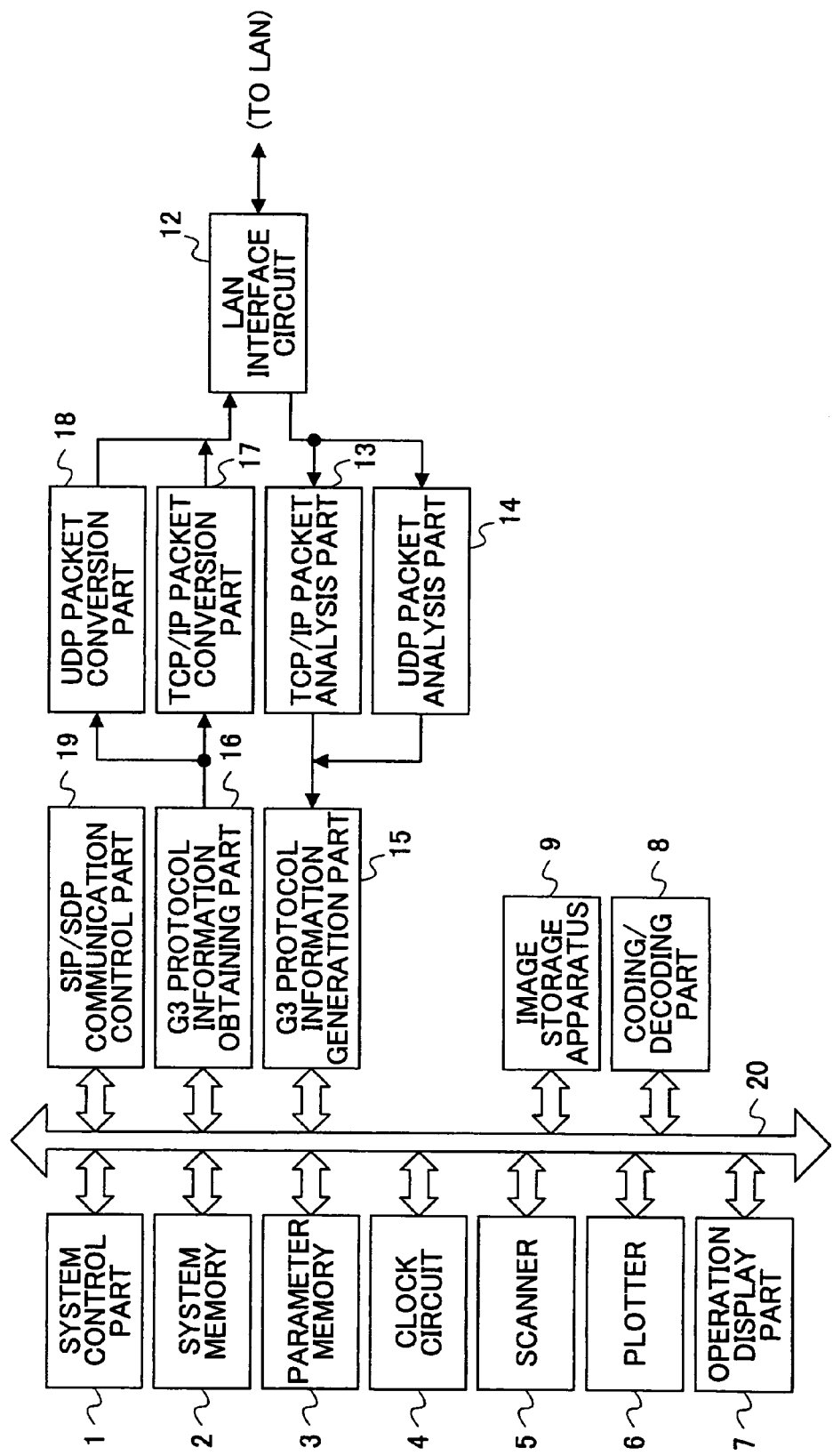
FIG. 2 is a block diagram showing one example of a configuration of a T38 terminal apparatus (TT1 or TT2) shown in FIG. 1.

FIG. 2 shows one example of a configuration of each of the T38 terminal apparatuses TT (TT1 and TT2).

In FIG. 2, a system control part 1 carries out various sorts of control processing such as processing of controlling various parts of the T38 terminal apparatus TT, processing of real-time transmission control procedure (procedure in compliance with the ITU-T recommendation T.38) and so forth. A system memory 2 stores control processing programs executed by the system control part 1, various sorts of data required by the system control part 1 to execute the processing programs, and so forth, and also, provides a work area for the system control part 1. A parameter memory 3 stores various sorts of information unique to the T38 terminal apparatus TT. A clock circuit 4 outputs current time information.

A scanner 5 reads original image information with a predetermined resolution. A plotter 6 carries out recording output of an image with a predetermined resolution. An operation and display part 7 is used for operating this facsimile apparatus and includes various sorts of keys, and various sorts of display devices.

A coder/decoder 8 carries out coding and compression of an image signal and decoding once coded and compressed image information into an image signal. An image storage device 29 stores many sets of image information in a coded and compressed state.

A LAN interface circuit 12 connects the T38 terminal apparatus TT to the local area network LAN, and, enables transmission/reception of various sorts of data via the local area network LAN. A TCP/IP packet analysis part 13 obtains received information from a TCP/IP packet once received via the IP network interface circuit 12, as a result of analyzing it, in a TCP mode. A UDP packet analysis part 14 obtains received information from a UDP packet once received via the IP network interface circuit 12, as a result of analyzing it, in an UDP mode.

A group 3 protocol information generation part 15 converts received information output from the TCP/IP packet analysis part 13 into corresponding group 3 transmission procedure signal information in a TCP mode, and also, converts received information output from the UDP packet analysis part 14 into corresponding group 3 transmission procedure signal information in a UDP mode, in a real-time transmission procedure.

A group 3 protocol information obtaining part 16 obtains group 3 facsimile transmission procedure information to be transmit in a real-time transmission procedure. A TPC/IP packet conversion part 17 converts group 3 facsimile transmission procedure information output from the group 3 protocol information obtaining part 16 into TCP/IP packet data in a TCP mode, and, an output thereof is provided to the IP network interface circuit 12.

A UDP packet conversion part 18 converts group 3 facsimile transmission procedure information output from the group 3 protocol information obtaining part 16 into UDP packet data in an UDP mode, and, an output thereof is provided to the IP network interface circuit 12.

An SIP/SDP communication control part 19 carries out call control processing or such with the use of an SIP and an SDP (session description protocol; see RFC2327 for details).

These system control part 1, system memory 2, parameter memory 3, clock circuit 4, scanner 5, plotter 6, operation and display part 7, coding and decoding part 8, image storage part 9, group 3 protocol information generation part 15, group 3 protocol information obtaining part 16 and SIP/SDP communication control part 19 are connected with an internal bus 20, and, data transmission/reception thereamong are carried out mainly with the use of the internal bus 20.

Figure 3:
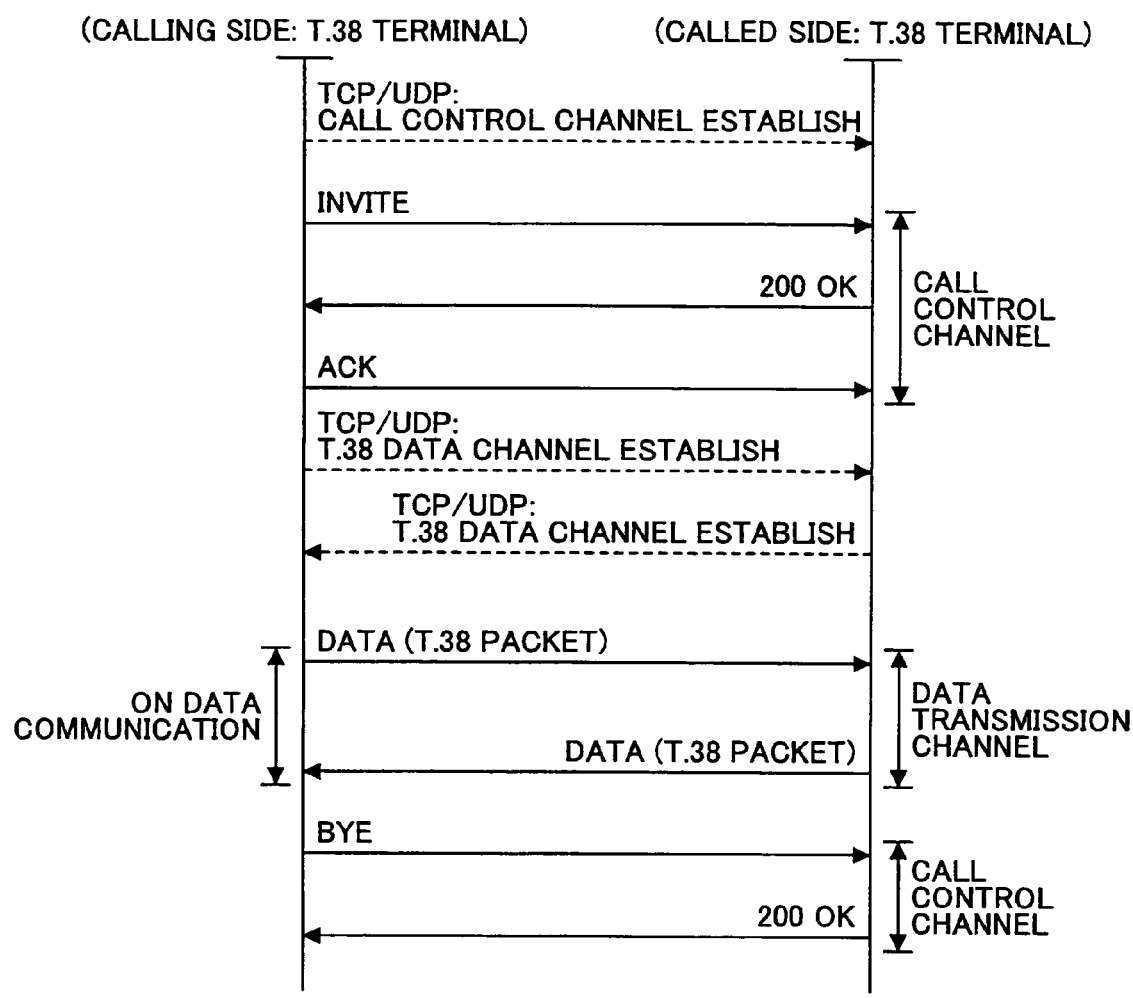
FIG. 3 is a time chart showing one example of a basic transmission procedure applied when mutual communication is carried out between the T38 terminal apparatuses TT in an SIP environment according to the embodiment of the present invention.

FIG. 3 shows one example of a basic transmission procedure applied when communication is carried out mutually between the T38 terminal apparatuses TT1 and TT2 under the SIP environment.

First, the calling-side T38 terminal apparatus establishes a call control channel (channel for carrying out call control) with the called-side T38 terminal apparatus with the use of the SIP server apparatus SV.

Then, the calling-side terminal apparatus transmits a message INVITE to the called-side T38 terminal apparatus. Then, the called-side T38 terminal apparatus, when it can respond thereto, responds to the message INVITE with a message 200 (OK). Thereby, the calling-side T38 terminal apparatus determines that communication can be carried out, and thus transmits a message ACK to the called-side T38 terminal apparatus. Thereby, a call is established between the calling-side T38 terminal apparatus and the called-side T38 terminal apparatus.

After that, the calling-side T38 terminal apparatus and the called-side T38 terminal apparatus establish T38 data channels (channel for data transmission) for each of these T38 terminal apparatuses for the purpose of data transmission and data reception therebetween. After that, with the use of the thus-established T38 data channels, T38 packets are transmitted/received, and thus, image information communication is carried out therebetween.

After the image information communication is finished, a message BYE is transmitted from the calling-side T38 terminal apparatus to the called-side T38 terminal apparatus with the use of the call control channel. The called-side T38 terminal apparatus returns a responding message (200 OK) to the calling-side T38 terminal apparatus. Thereby, the call control connection between the calling-side T38 terminal apparatus and the called-side T38 terminal apparatus is finished.

In this transmissions procedure, a port number allocated for the T38 data channel is dynamically changed, and thus, is not fixed. Thereby, when the T38 terminal apparatus carries out communication via a firewall or via a NAT, a packet of the thus-set port number may not pass through the firewall or the NAT.

Figures 4, 5:
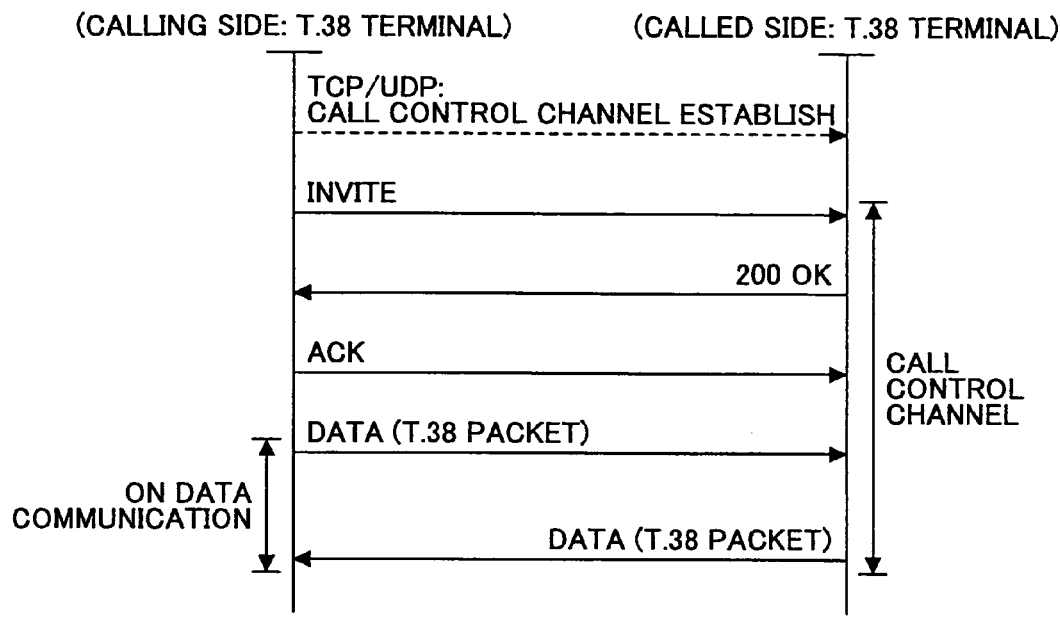
FIG. 4 is a time chart showing one example of a transmission procedure applied when data communication is carried out with the use of a port same as that of a call control channel according to the embodiment of the present invention.
FIG. 5 is a rough diagram showing one example of an SPD adding a manufacture code according to the embodiment of the present invention.

In order to solve this problem, according to the embodiment of the present invention, as shown in FIG. 4, data communication is made to be carried out with the use of a port same as that of the call control channel. For this purpose, the calling-side T38 terminal apparatus sets an SDP, in which setting is made such that a port of the call control channel may also be allocated for a data transmission channel, in a body of the message INVITE, when transmitting the message INVITE to the called-side T38 terminal apparatus.

In other words, in the SIP message (the message INVITE, the responding message thereto, or such), the SDP is added to the message body thereof, and then, a data channel is established according to the contents of the thus-added SDP. Then, after the port same as that of the call control channel is also allocated for the data channel in each of both the calling-side T38 terminal apparatus and the called-side T38 terminal apparatus, no data channel is newly established, and, the call control channel is used as it is also for exchanging T38 packets (data transfer).

Further, according to the recommendation for SIP (RFC3261), after the message INVITE is transmitted and the responding massage thereto is received, the ACK message is transmitted from the side from which the INVITE message has been transmitted. In this case, after the ACK message is received, it is determined that T38 communication is started, and, a message transferred through the call control channel after that is determined as being a T38 packet.

Furthermore, as shown in FIG. 5, in the SDP, a manufacture code is set. With the use of the manufacture code, determination as to what functions each terminal has is carried out between the own terminal and the counterpart terminal. When it is determined therefrom that the functions of each terminal are same therebetween, the call connection is finished without transmitting a message BYE after the data communication is finished.

In this case, since a message BYE and a responding message thereto (200 OK) are once transmitted and received at a time of finishing communication in SIP communication as part of the data communication, the communication finish can be already recognized mutually between the counterparts therewith. Therefore, a procedure for finishing the call control (with a further message BYE and a responding message thereto) can thus be omitted.

In other words, in the case where a same port is allocated for both a call control channel and a data channel, it is difficult to determine whether a received packet therethrough is an SIP message or a T.38 message. Therefore, according to the embodiment of the present invention, when it is previously recognized from arbitrary information that the counterpart terminal has a capability of carrying out communication via the same port, transmission and reception of a message BYE and a responding message thereto (200 OK) as a call control finishing procedure is omitted, and thus, communication with the use of the same port used for both SIP call control and T.38 data transfer is finished properly without carrying out transmission and reception of a message BYE as a call control finishing procedure, as shown in FIG. 4.

As shown in FIG. 4, according to the embodiment of the present invention, as mentioned above, in comparison to the procedure described above with reference to FIG. 3, the procedure to establish other new data channels are omitted, and also, transmission and reception of the message BYE and the responding message thereto (200 OK) as the call control finishing procedure is omitted.

Figure 6:
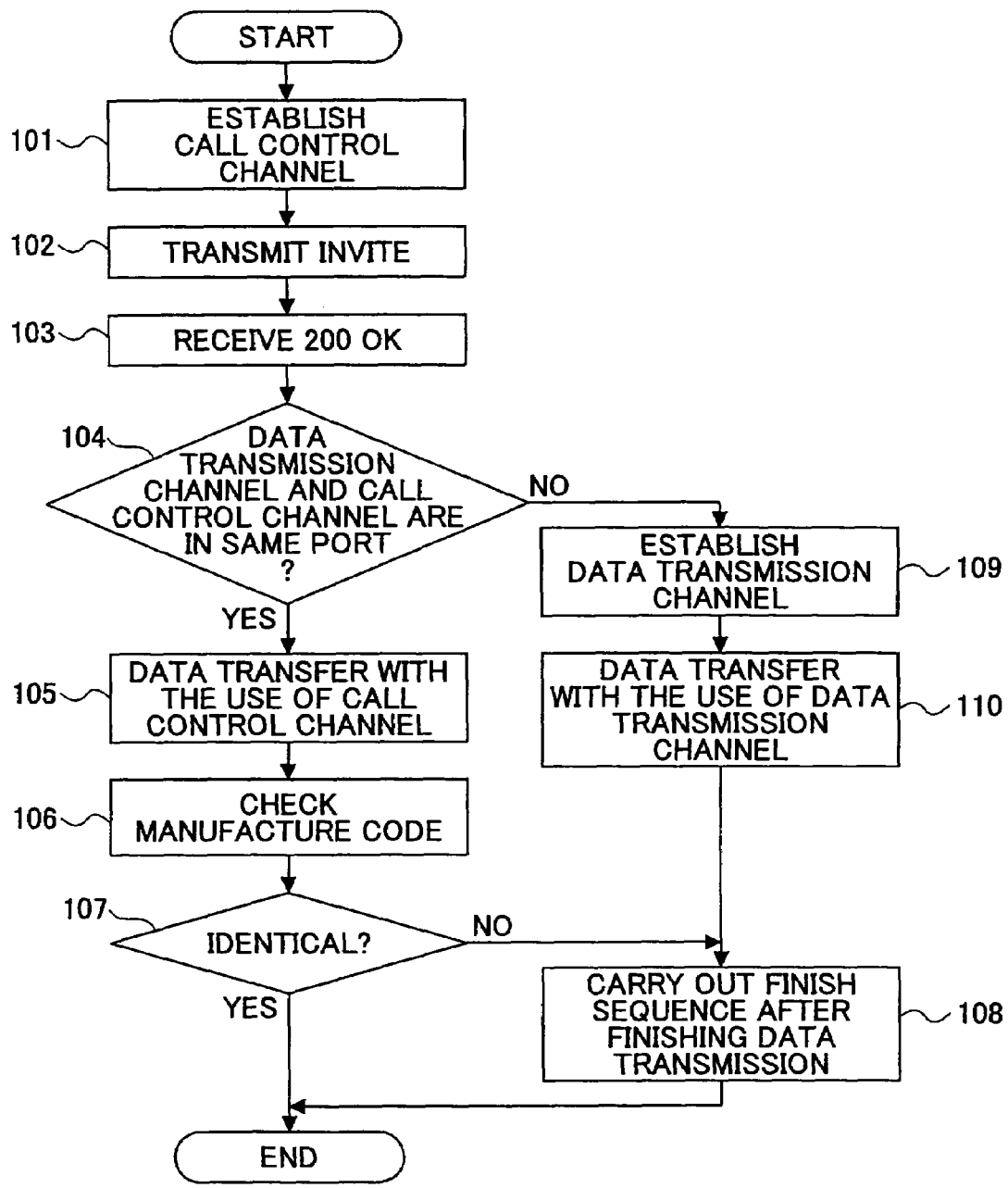
FIG. 6 is a flow chart showing one example of communication processing carried out by the calling-side T38 terminal apparatus according to the embodiment of the present invention.

FIG. 6 shows one example of communication processing of the calling-side T38 terminal apparatus.

First, a call control channel is established with the called-side T38 terminal apparatus in Step 101. With the use of the thus-established call control channel, a message INVITE is transmitted in Step 102, and a responding message thereto (200 OK) is received in Step 103.

Then, it is determined whether or not a port number same as a port number allocated for the call control channel is also allocated for a data transmission channel, in Step 104. When a result of the determination of Step 104 is Yes, data transfer is carried out with the use of the call control channel, in Step 105.

After the data transfer is completed, it is determined whether or not a manufacture code in an SPD received from the called-side T38 terminal apparatus is same as a value set in the own apparatus, in Step 107. When a result of the determination of Step 107 is Yes, since a call finishing procedure is not carried out, the current operation is finished.

When a result of the determination of Step 107 is No, a predetermined call finishing sequence is carried out with the use of the call control channel in Step 108, and then, the current operation is finished.

When a result of the determination Step 104 is No, a channel for data transmission is newly established in Step 109, and data transfer is carried out with the use of the thus-established channel for data transmission in Step 110. Then, after the data transfer is completed, Step 108 is carried out, a predetermined call finishing sequence is carried out with the use of the call control channel, and then, the current operation is finished.

Figure 7:
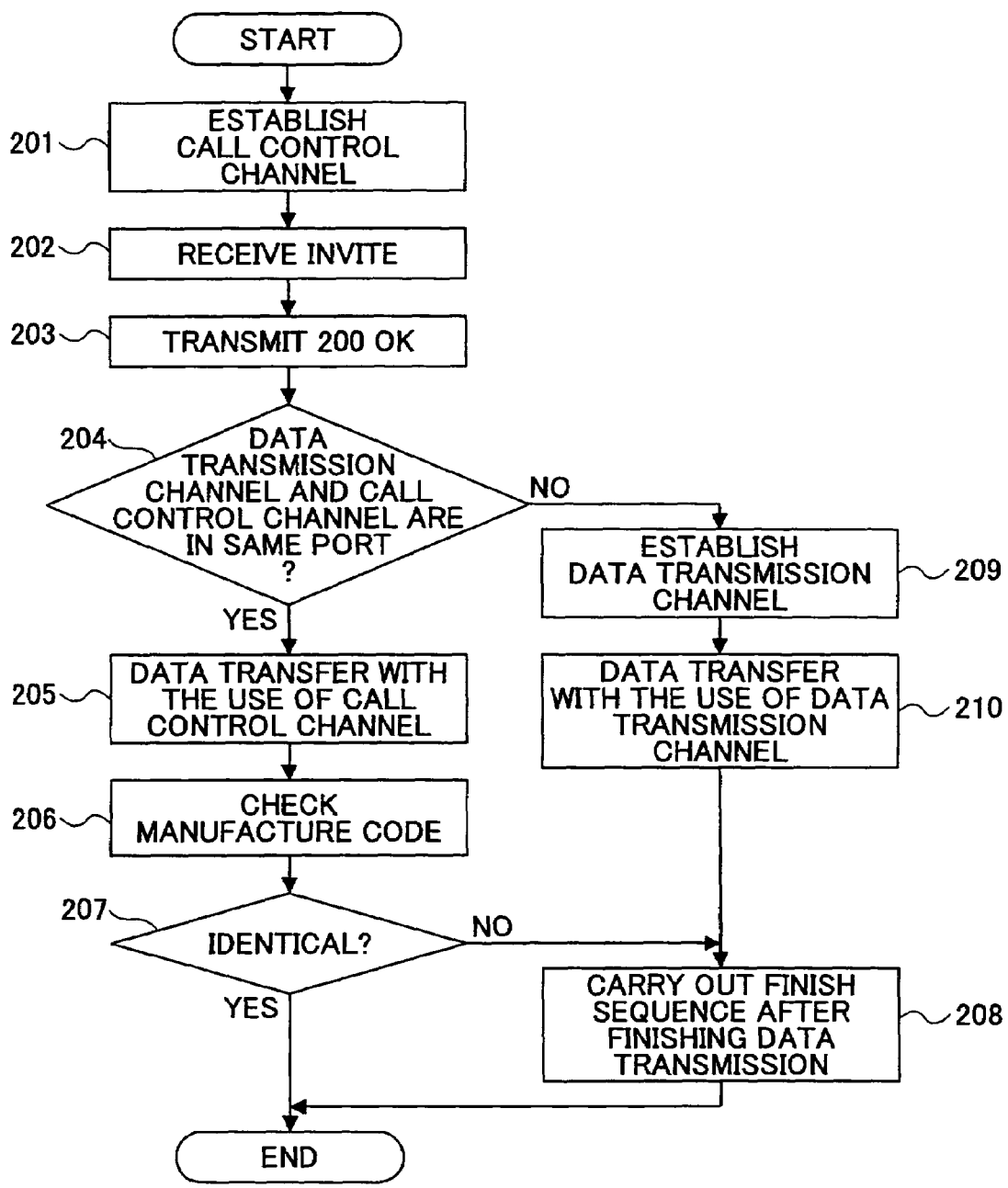
FIG. 7 is a flow chart showing one example of communication processing carried out by the called-side T38 terminal apparatus according to the embodiment of the present invention.

FIG. 7 shows one example of communication processing of the called-side T38 terminal apparatus.

First, a call control channel is established with the calling-side T38 terminal apparatus in Step 201. With the use of the thus-established call control channel, a message INVITE is received in Step 202, and a responding message thereto (200 OK) is transmitted in Step 203.

Then, it is determined whether or not a port number same as a port number allocated for the call control channel is also allocated for a data transmission channel, in Step 204. When a result of the determination of Step 204 is Yes, data transfer is carried out with the use of the call control channel, in Step 205.

After the data transfer is completed, it is determined whether or not a manufacture code in an SPD received from the calling-side T38 terminal apparatus is same as a value set in the own apparatus, in Step 207. When a result of the determination of Step 207 is Yes, since a call finishing procedure is not carried out, the current operation is finished.

When a result of the determination of Step 207 is No, a predetermined call finishing sequence is carried out with the use of the call control channel in Step 208, and then, the current operation is finished.

When a result of the determination Step 204 is No, a channel for data transmission is newly established in Step 209, and data transfer is carried out with the use of the thus-established channel for data transmission in Step 210. Then, after the data transfer is completed, Step 208 is carried out, a predetermined call finishing sequence is carried out with the use of the call control channel, and then, the current operation is finished.

Thus, according to the embodiment of the present invention, transfer of T.38 data is carried out with the use of a channel same as a call control channel established originally for SIP. As a result, data transfer can be carried out with the use of a Well-known port, and thereby, it is possible to reduce a required resource such as a memory, and also, it is possible to carry out T.38 data transfer properly even in a case where communication is carried out via a firewall or a NAT.

Further, since it is possible to check as to whether or not a counterpart terminal has a capability same as that of an own terminal by adding terminal information in an SPD, it becomes possible to omit a procedure of a BYE (finishing) message and a responding message thereto (200 OK) which is normally necessary. Thereby, it becomes possible to reduce a time required for carrying out a finishing procedure.

Furthermore, since it is possible to check as to whether or not a counterpart terminal has a capability same as that of an own terminal by adding terminal information in an SPD, it becomes possible to determine that the counterpart terminal does not have the same capability. Thereby, it is possible to determine whether or not a procedure of a BYE (finishing) message and a responding message thereto (200 OK) is necessary, and, it is possible to apply a normal sequence if it is then determined that the procedure for a BYE (finishing) message and a responding message thereto (200 OK) is necessary.

The present application is based on the Japanese Priority Application No. 2003-319265, filed on Sep. 11, 2003, the entire contents of which are hereby incorporated herein by reference.

What is claimed is:

1. A network communication apparatus directly connectable with a packet communication network, comprising an interface for connecting to a circuit under an environment of a communication network for SIP terminals, and having a capability of carrying out facsimile transmission/reception, comprising:
   a call control part carrying out a call control process in an SIP; and
   an SDP control part transmitting and receiving an SDP added to a message body of the SIP, wherein:
   said network communication apparatus carries out, in a same session, both a call control session transmitting and receiving an SIP message and an SDP, and a T.38 session transmitting and receiving a T.38 signal.

2. The network communication apparatus as claimed in claim 1, further comprising:
   a determining part determining whether or not the SIP session and the T.38 session can be carried out in a same session, wherein:
   in a case of requesting carrying out of the SIP session and the T.38 session in a same session and determining previously that data transfer can be carried out in a same session, said terminal apparatus omits transmission of a BYE message in the SIP and a responding message therefor.

3. The network communication apparatus as claimed in claim 1, further comprising:
   a determining part determining whether or not the SIP session and the T.38 session can be carried out in a same session, wherein:
   in a case of requesting carrying out of the SIP session and the T.38 session in a same session while not being able to determine that data transfer can be carried out in a same session, said communication apparatus receives a BYE message in the SIP after completion of T.38 communication, and transmits a responding message therefor.

4. A communication system comprising:
   a network communication apparatus directly connectable with a packet communication network, which comprises an interface for connecting to a circuit under an environment of a communication network for SIP terminals, and has a capability of carrying out facsimile transmission/reception, wherein:
   said network communication apparatus further comprises:
   a call control part carrying out a call control process in an SIP; and
   an SDP control part transmitting and receiving an SDP added to a message body of the SIP, wherein:
   said network communication apparatus carries out, in a same session, both a call control session transmitting and receiving an SIP message and an SDP, and a T.38 session transmitting and receiving a T.38 signal.

5. The communication system as claimed in claim 4, wherein:
   said network communication apparatus further comprises:
   a determining part determining whether or not the SIP session and the T.38 session can be carried out in a same session, wherein:
   in a case of requesting carrying out of the SIP session and the T.38 session in a same session and determining previously that data transfer can be carried out in a same session, said communication apparatus omits transmission of a BYE message in the SIP and a responding message therefor.

6. The communication system as claimed in claim 4, wherein:
   said network communication apparatus further comprises:
   a determining part determining whether or not the SIP session and the T.38 session can be carried out in a same session, wherein:
   in a case of requesting carrying out of the SIP session and the T.38 session in a same session while not being able to determine that data transfer can be carried out in a same session, said terminal apparatus receives a BYE message in the SIP after completion of T.38 communication, and transmits a responding message therefor.

7. A method for communication in a network communication apparatus directly connectable with a packet communication network, which comprises an interface for connecting to a circuit under an environment of a communication network for SIP terminals, and has a capability of carrying out facsimile transmission/reception, said method comprising the steps of:
   a) carrying out a call control process in an SIP; and
   b) transmitting and receiving an SDP added to a message body of the SIP; and
   c) carrying out, in a same session, both a call control session transmitting and receiving an SIP message and an SDP, and a T.38 session transmitting and receiving a T.38 signal.

8. The communication method as claimed in claim 7, further comprising the steps of:
   d) determining whether or not the SIP session and the T.38 session can be carried out in a same session; and
   e) omitting transmission of a BYE message in the SIP and a responding message thereto, when requesting carrying out of the SIP session and the T.38 session in a same session and determining previously that data transfer can be carried out in a same session.

9. The communication method as claimed in claim 7, further comprising the steps of:
  d) determining whether or not the SIP session and the T.38 session can be carried out in a same session; and
  e) receiving a BYE message in the SIP and transmitting a responding message thereto, when once requesting carrying out of the SIP session and the T.38 session in a same session while not being able to determine that data transfer can be carried out in a same session.

* * * * *